United States Patent [19]
Suzuki

[11] Patent Number: 5,780,069
[45] Date of Patent: Jul. 14, 1998

[54] BLOW MOLDING APPARATUS HAVING RADIANT HEATING MEANS FOR PREFORMS

[75] Inventor: Saburo Suzuki, Nagano-ken, Japan

[73] Assignee: Frontier, Inc., Nagano-ken, Japan

[21] Appl. No.: 564,037

[22] PCT Filed: Apr. 14, 1995

[86] PCT No.: PCT/JP95/00739

§ 371 Date: Feb. 9, 1996

§ 102(e) Date: Feb. 9, 1996

[87] PCT Pub. No.: WO95/28270

PCT Pub. Date: Oct. 26, 1995

[30] Foreign Application Priority Data

| Apr. 18, 1994 | [JP] | Japan | 6-104777 |
| Jun. 24, 1994 | [JP] | Japan | 6-165899 |
| Dec. 22, 1994 | [JP] | Japan | 6-320070 |

[51] Int. Cl.[6] .................................................. B29C 49/64
[52] U.S. Cl. .................. 425/174.4; 264/454; 264/458; 264/535; 425/526; 425/535
[58] Field of Search .................................. 425/526, 534, 425/174.4; 264/535, 454, 457, 458; 432/10, 11, 12, 77, 124

[56] References Cited

U.S. PATENT DOCUMENTS

| 3,283,046 | 11/1966 | De Witt et al. | 425/534 |
| 4,234,297 | 11/1980 | Kontz | 425/174.4 |
| 4,315,725 | 2/1982 | Yoshino | 425/174.4 |
| 4,354,813 | 10/1982 | Collombin | 425/526 |
| 4,409,455 | 10/1983 | Belcher et al. | 264/454 |
| 4,522,581 | 6/1985 | Schad et al. | 425/534 |
| 4,606,723 | 8/1986 | Pasternicki | 425/174.4 |
| 4,856,978 | 8/1989 | Voss et al. | 425/526 |
| 5,180,893 | 1/1993 | Sugiyama et al. | 264/458 |
| 5,232,715 | 8/1993 | Fukai | 425/526 |
| 5,322,651 | 6/1994 | Emmer | 425/526 |

FOREIGN PATENT DOCUMENTS 6-99482  4/1994  Japan.

*Primary Examiner*—Robert Davis
*Attorney, Agent, or Firm*—Burns, Doane Swecker & Mathis LLP

[57] ABSTRACT

The invention aims at enabling inexpensive manufacture of a preform carrying mechanism of a simple construction for a blow molding apparatus for biaxial stretching of hollow moldings such as PET bottles from preforms. The molding apparatus is provided with a linear carrying line for carrying preforms (P), and the carrying line comprises a beam (81), on which a multiplicity of carrying members (82) are supported, a carrying mechanism (83) and a lifting mechanism (84) for the beam. The carrying members (82) on the beam are repeatedly moved back and forth at a constant feed pitch by means of the mechanisms. A preform grasping/releasing mechanism (85) is actuated in synchronism with the movement so that while the respective carrying members (82) are caused to advance from backward positions, the preforms are delivered to the respective carrying members (82). Since the preforms P can be carried along the carrying line only by moving the beam (81), which supports thereon the multiplicity of carrying members (82), forward and backward at a constant pitch, the carrying mechanism of a simple construction can be inexpensively manufactured.

10 Claims, 16 Drawing Sheets

P : Preform
1A : Frame
81 : Beam
82 : Carrying member
83 : Carrying mechanism
84 : Lifting mechanism
85 : Grasping/releasing mechanism 100 : Mold closing mechanism
120 : Horizontal sliding mechanism P : Preform
1A : Frame
81 : Beam
82 : Carrying member
83 : Carrying mechanism
84 : Lifting mechanism
85 : Grasping/releasing mechanism

BLOW MOLDING APPARATUS HAVING RADIANT HEATING MEANS FOR PREFORMS

TECHNICAL FIELD

This invention relates to a blow molding apparatus suitable for molding PET bottles and the like. More particularly, this invention relates to an improvement in the preform carrying mechanism of a blow molding apparatus. This invention also relates to a heating control system used in a blow molding apparatus for radiant heating of preforms to a temperature suitable for blow molding.

BACKGROUND ART

A hollow molding such as a PET bottle is molded by heating a cylindrical preform extrusion molded from a thermoplastic resin to have an opening at one end and a closed bottom at the other and then biaxial stretching the preform after it has been cooled to a temperature suitable for molding. The blow molding apparatus used for this is constituted to carry out these processes on preforms as they are successively carried along a carrying line at a constant feed pitch.

A blow molding apparatus of this type is disclosed in JP-B 1-17855. The apparatus taught by this publication has a preform carrying line closed on four sides and block-shaped carrying units disposed on this line are successively fed at a constant feed pitch. The carrying units are equipped with carrying members for immobilizing the preforms by insertion into their openings, and the preforms are carried by the carrying units with the carrying members inserted therein. Each carrying unit receives a preform at a preform loading section, passes through a heating section and a stretch-molding section, delivers the molding to an offtake section, and then returns to the preform loading section empty. Circular carrying lines are also used.

The carrying system of the prior art blow molding apparatus thus includes a so-called closed carrying line having a large number of preform carrying members disposed at a constant pitch, and the preform carrying members are successively fed at a constant pitch. Each carrying member carries a preform through a heating section and a stretch-molding section located along the carrying line and then returns to the preform loading section empty after passing through the stretch-molding section and delivering the molding to the offtake section thereof. In addition, the carrying members can be rotated in the heating section for uniformly heating the preforms by radiant heat from only one direction.

In the case of using this type of so-called closed carrying line, however, the carrying members have to be returned to their initial position empty after takeoff of the molding. This is not efficient because it results in a proportional operation loss. Further, since the carrying members which travel on the line need to be additionally equipped with rotating systems for rotating the preforms, their systems are complicated. In addition, fasteners are required for constantly fastening the preforms to the carrying members traveling on the line. Moreover, in the prior art the carrying members move and molding air supply etc. is conducted with respect to the preforms held by the carrying member in the stretch-molding section. It is therefore necessary to provide the carrying members with systems for blowing in air. The carrying member systems also tend to increase in complexity in this point.

On the other hand, the heating of preforms in prior-art blow molding apparatuses is generally conducted by positioning the radiant heating element of an infrared heater or the like along the preform carrying line and uniformly heating the conveyed preforms from the side as they are rotated about their axes. Since radiant heating from the outside causes the outer surface of the preform to be heated more rapidly than the inner surface, their temperatures change as shown by the curves A1 (outer surface temperature) and A2 (inner surface temperature) in FIG. 10. As can be seen from these curves, the heating increases the outer surface to a higher temperature. Since the stretch rate of the inner surface is larger, however, the temperature of the inner surface has to be made higher in the ensuing stretch-molding. After heating, therefore, the preform is allowed to stand for cooling until the temperature difference between the inner and outer surfaces reverses, whereafter the stretch-molding is conducted.

Since the outer surface is thus heated more rapidly during the radiant heating of the preform, there is a risk that, unless the heating is conducted properly, the outer surface may be degraded by overheating before the inner surface has reached an adequately heated state.

Overheating of the preform also increases the time required for the preform to cool till the inner surface temperature is higher than the outer surface temperature, which is the temperature state suitable for stretch-molding. An increase in cooling time is undesirable because it lowers the efficiency of the molding line.

Moreover, in stretch-molding a PET bottle or the like from a preform, the amount of stretching differs at different portions of the preform depending on the shape of the molded product. As a result, the molding may be formed with local thin and thick portions. It is therefore necessary to appropriately regulate the temperature state of the preform during stretch-molding.

DISCLOSURE OF THE INVENTION

In view of the foregoing points, an object of this invention is to propose a blow molding apparatus equipped with a carrying system which has a simple structure and can be manufactured at low cost.

Another object of the invention is to propose a blow molding apparatus equipped with a heating system enabling radiant heating of preforms without overheating the outer surfaces thereof.

Another object of the invention is to propose a blow molding apparatus equipped with a temperature regulation system enabling preforms to attain a temperature state suitable for molding in a short time after radiant heating.

Another object of the invention is to propose a blow molding apparatus which optimizes stretch-molding of preforms by conducting appropriate preform heating.

For achieving the foregoing objects, the blow molding apparatus of this invention comprises preform heating means for radiant heating of cylindrical preforms having an opening at one end and a closed bottom at another end, stretch-molding means for biaxial stretch-molding of heated preforms into hollow moldings of a prescribed shape, and preform carrying means for intermittently carrying preforms through the heating means to the stretch-molding means at a prescribed feed pitch, the carrying means being constituted to include a linear member extending in the preform carrying direction, multiple preform carrying members supported by the linear member as disposed at regular intervals in the preform carrying direction and capable of being inserted into the openings of the preforms, a carrying mechanism adapted to move the linear member to a retracted position one feed pitch backward by lowering it from its initial position to a lowered position where the carrying members are out of contact with the preforms, moving it from the lowered position backward in a direction opposite to the carrying direction and then raising it, and then to move it forward from the retracted position to the initial position, and a grasping/releasing mechanism adapted to grasp the preforms while the carrying members supported by the linear member are moving from the initial position to the retracted position and to release and give the preforms over to the carrying member upon its arrival at the retracted position.

With this configuration, the operation of feeding the carrying members supported by the linear member consists merely of moving them forward and backward in the carrying direction by the amount of the feed pitch. In addition, since it suffices for the preform grasping/releasing mechanism to grasp/release the preforms at a fixed position, the carrying means is simple and inexpensive to manufacture.

The grasping/releasing mechanism can be constituted to have a pair of left and right grasping plates disposed in the carrying direction and preform grasping sections which are formed at intervals in the carrying direction equal to the intervals of the carrying members when the grasping plates are closed onto each other and which grasp preforms upon closing of the grasping plates and release the preforms upon opening of the grasping plates. In this case, the preforms being carried by the carrying members can be simultaneously grasped by closing the pair of grasping plates and the preforms can be simultaneously given over to the carrying members by opening the grasping plates.

Instead of using a pair of grasping plates of the aforesaid type, it is possible to adopt a configuration comprising multiple roller groups disposed at intervals in the carrying direction equal to the intervals of the carrying members and a roller movement mechanism for moving the rollers of the individual groups toward and away from each other for grasping and releasing the preforms.

As the heating means in this invention it is possible to adopt one comprising radiant heat sources disposed along a preform carrying line of the carrying means, a radiant heat source being disposed at a position corresponding to every preform halt position.

When heating means of this configuration is used, the preforms being carried at a constant pitch are radiantly heated at the halt positions. In other words, they are intermittently heated. As compared with the case of continuous radiant heating, therefore, increase in the preform outer surface temperature is suppressed and the inner-outer surface temperature difference is smaller. Overheating of the outer surface of the preforms can therefore be avoided. In addition, the time for cooling to a temperature suitable for molding is shortened.

As the heating means there can be used a near infrared heater or the like. In this case, it suffices for the filament serving as the heating element to have coiled sections at the preform halt positions and to extend straight at positions therebetween.

It is preferable to provide preform rotation means for rotating the preforms carried by the preform carrying means about their axes and have the preform rotation means rotate the preforms to vary the preform outer peripheral surface portion facing the heat source between adjacent halt positions. Since this causes the radially heated portion of the preform outer peripheral surface to change progressively, it enables uniform radiant heating of the entire preform outer peripheral surface.

This invention further comprises an air-cooling means for cooling the preforms, after radiant heating, by blowing air thereon, the air-cooling means cooling each preform at a time point after its temperature has passed peak value. By rapidly lowering the preform outer surface temperature in this way, it is possible to establish a temperature state in which the inside surface temperature is higher, namely, a temperature state suitable for molding, in a short time after heating. For this, it is preferable to cool the preform by blowing air thereon in the axial direction of the preform. By this it is possible to cool the preforms uniformly and with good efficiency.

On the other hand, the invention is characterized in that for enabling the stretch-molding operation to be appropriately conducted in the stretch-molding means, a temperature adjustment means capable of adjusting the heated temperature of the preforms is disposed on the carrying line immediately ahead of the stretch-molding means. For example, there is provided a temperature uniformizing means for adjusting the preforms to a temperature distribution suitable for the stretch-molding temperature by blowing onto the entire preform air containing moisture and adjusted to a prescribed temperature range. By this, the preforms can be accurately adjusted to the optimum temperature for stretch-molding immediately before stretch-molding.

Moreover, for enabling adjustment of the amount of stretching and the like at different portions of the preforms it is preferable to provide temperature change imparting means for imparting temperature change to local portions of the preforms by locally blowing air containing moisture and adjusted to a prescribed temperature range on the preforms after they have been adjusted to a uniform temperature. Instead of locally blowing air on the preforms, it is possible to impart them with temperature change by bringing a heat conductive piece adjusted to a prescribed temperature into contact therewith.

Since this makes it possible to adjust the amount of stretching at different portions of the preforms during stretch-molding, it has the advantage of enabling the different portions to have ideal thickness after molding.

Best Mode for Carrying out the Invention

Figure 1:
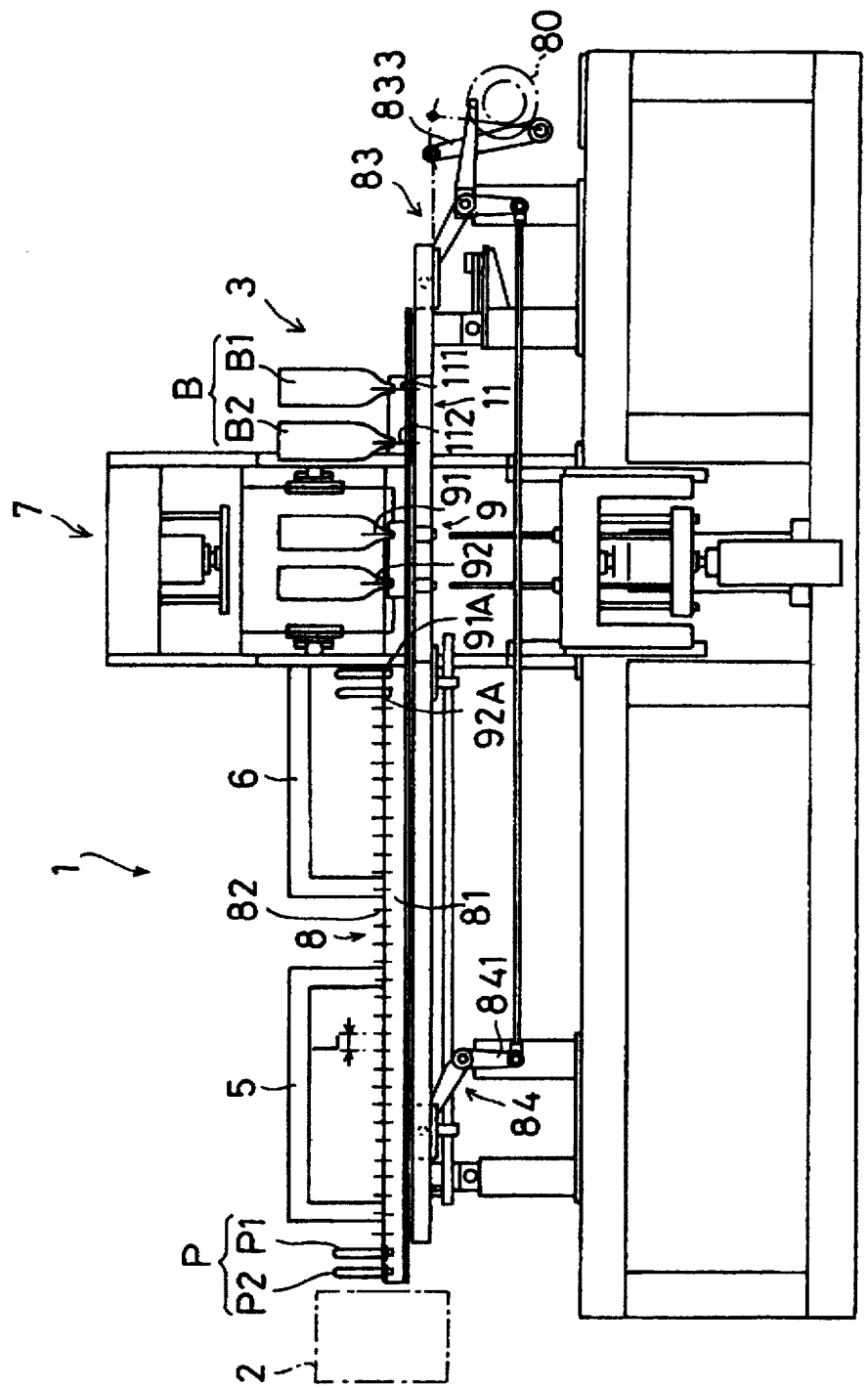
FIG. 1 is a schematic side view showing the structure of a blow molding apparatus which is a first embodiment of the invention.
Figure 2:
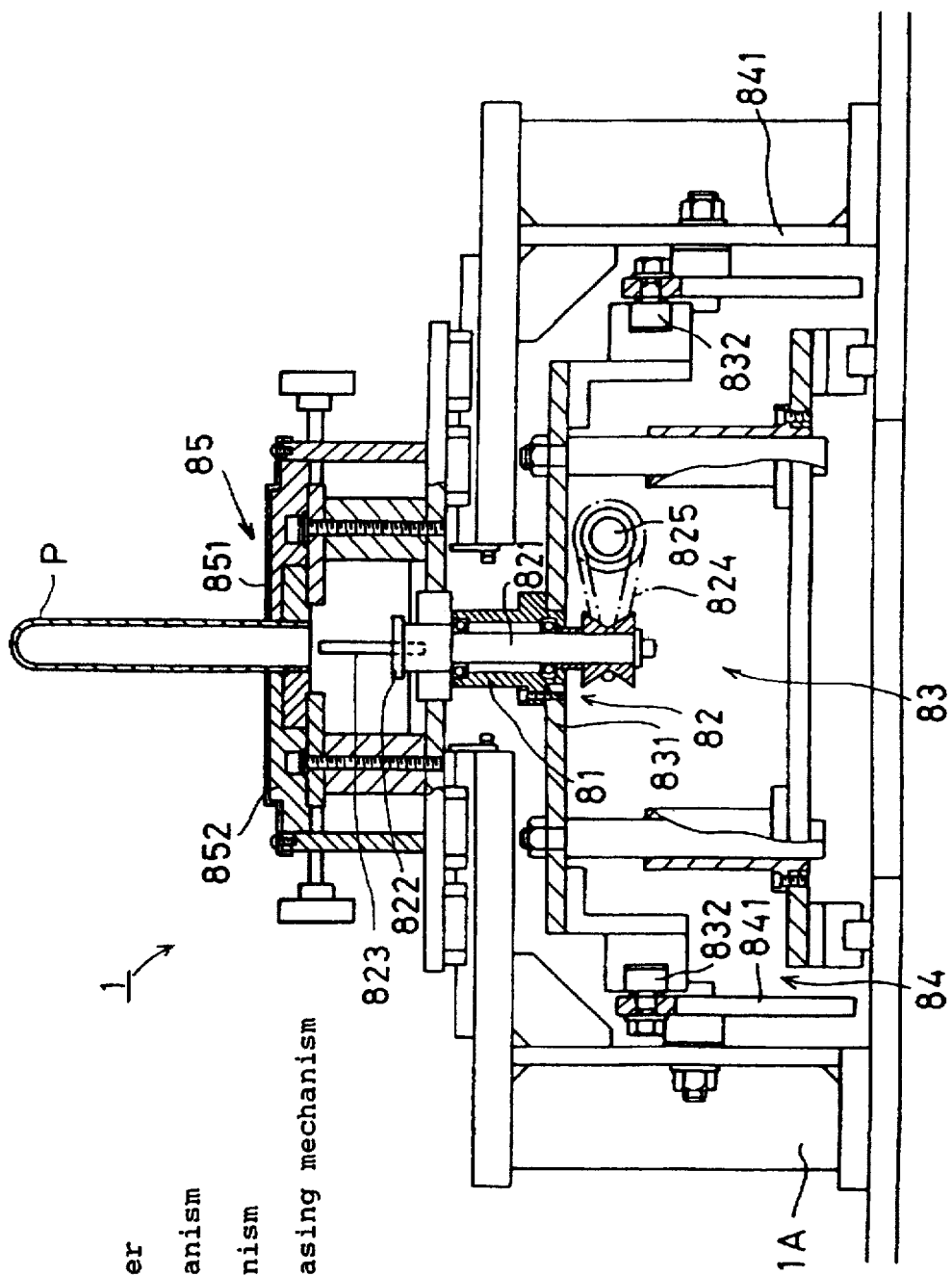
FIG. 2 is a schematic cross-sectional view of the apparatus of FIG. 1.

Embodiments of the invention of the invention will be explained with reference to the drawings.
First embodiment FIGS. 1 and 2 show the overall structure of a blow molding apparatus to which the present invention has been applied. The blow molding apparatus 1 of this embodiment is for blow molding of PET bottles, namely for stretch-molding preforms P of cylindrical shape having an opening at one end and a closed bottom at the other (of test tube shape) into containers B for soft drinks or the like.

As shown in FIG. 1, the apparatus 1 of this embodiment receives two preforms P1, P2 at a time from a preform loading station 2 at the left end of the figure and, after molding them, delivers the resulting containers B1, B2 from a container takeoff station 3 to the next processing station (not shown). A linear carrying line is formed between the loading station 2 and the takeoff station 3. An upstream heating station 5, a downstream heating station 6 and a stretch-molding machine 7 are disposed in order along carrying direction of the carrying line. The preforms P carried along the carrying line are heated to a prescribed temperature in the upstream station 5 and then have their surfaces cooled after passing therethrough. They are then reheated at an upstream side carrying line 61 of the downstream heating station 6 and thereafter cooled to a temperature appropriate for stretch-molding at a downstream side carrying line 62. Next, they are stretch-molded in the stretch-molding machine 7 to form containers B.

The carrying mechanism for carrying the preforms P along the carrying line is constituted of a first carrying section 8 for carrying the preforms P received at the loading station 2 to the entrance of the stretch-molding machine 7, a second carrying section 9 for receiving the preforms P from the first carrying section 8 and molding them in the stretch-molding machine 7, and a third carrying section 11 for carrying formed containers B to the takeoff station 3.

The structure of the first carrying section 8 will explained with reference to FIGS. 1 and 2. The first carrying section 8 is basically constituted of a beam 81 disposed along the carrying line, multiple carrying members 82 mounted on the upper surface of the beam 81, a carrying mechanism 83 for moving the beam 81 forward and backward in the carrying direction, a lifting mechanism 84 for raising and lowering the beam 81, and a grasping/releasing mechanism 85 disposed along the carrying line.

The carrying members 82 are mounted on the upper surface of the beam 81 as spaced at regular intervals L. Each carrying member 82 has a rod 821 supported to be rotatable relative to the beam 81, a carrying surface 822 formed at the upper end of the rod 821, and an insertion rod 823 extending vertically from the center of the carrying surface 822. The carrying mechanism 83 of the beam has a support section 831 for supporting the beam 81 and the support section 831 is supported by the lifting mechanism 84 through rollers 832 so as to be movable forward and backward in the carrying direction. In addition, one end of the beam support section 831 is connected through a linkage (not shown) with a linkage 833 for oscillating forward and backward in the carrying direction. The beam support section 831 can be moved forward and backward relative to the carrying direction at a constant pitch by the oscillation of the linkage 833. In this embodiment, it can be moved at a constant feed pitch of 2L.

The lifting mechanism 84 is constituted of the aforesaid beam support section 831 and a vertical guide 841 which supports the support section 831 through the rollers 832 so as to be vertically movable with respect to an apparatus frame 1A. The beam support section 831 is configured to be raised and lowered by a constant distance by the linkage 841. This embodiment is configured to conduct the beam movement and lifting operations by power supplied through a linkage from a common power source. Since this linkage can have any of various configurations and the related technology is well known among experts in the field, the particulars thereof are omitted from this specification.

In this embodiment, the lower end of the rod 821 of each carrying member 82 is connected through a pulley-belt mechanism 824 with a motor 825 attached to the beam support section 831. The rod 821 is rotated about its axis by this motor.

Figure 3:
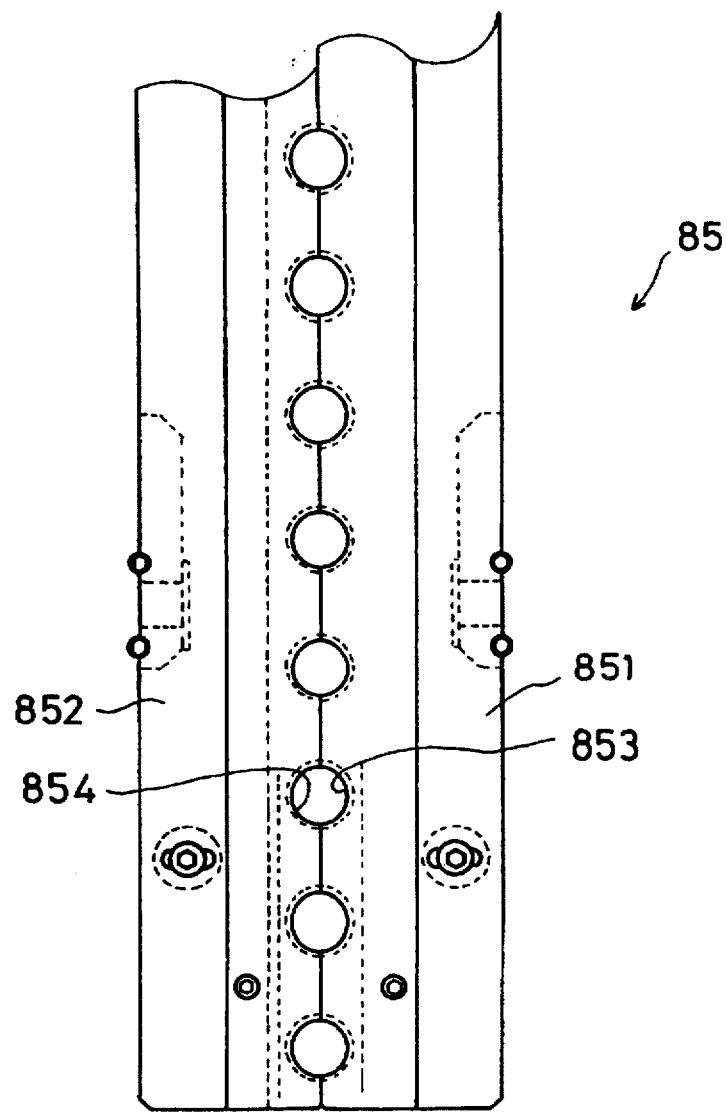
FIG. 3 is a partial plan view showing a pair of grasping plates constituting a preform grasping/releasing mechanism of the apparatus of FIG. 1.

As shown in FIGS. 2 and 3, the grasping/releasing mechanism 85 of this embodiment is equipped with a pair of grasping plates 851, 852 located one each on the left and right relative to the carrying direction. The grasping plates 851, 852 are configured to be laterally symmetrical and are supported on the apparatus frame 1A to be laterally movable. As will be understood from FIG. 3, the inner edges of the grasping plates 851, 852 are formed at a constant pitch L with semicircular depressions 853, 854 matched to the outer diameter of the open end portion of the preforms P. When the grasping plates are brought together, therefore, the left and right semicircular depressions form a circular preform grasping section. The opening and closing of the grasping plates 851, 852 is also conducted through a linkage or the like by the same power source 80 as that for the beam 81.
(Preform feed operation)

Figure 4A:
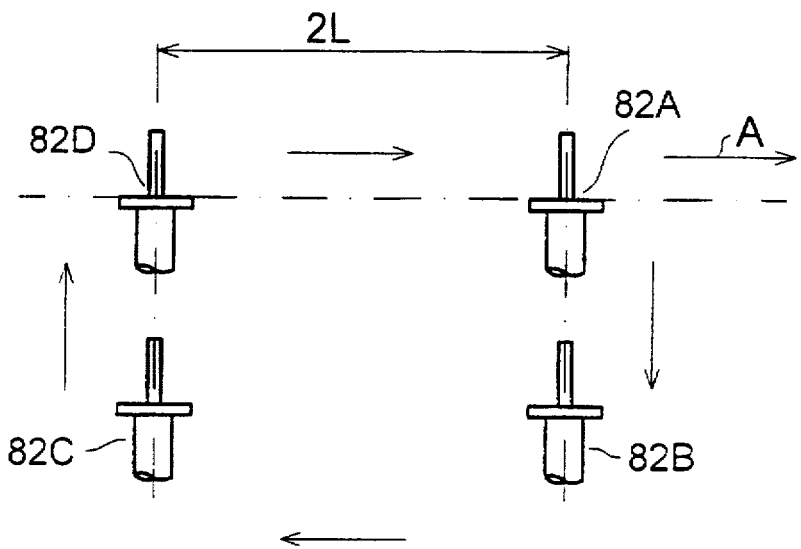
FIGS. 4(A), 4(B) and 4(C) are a set of diagrams for explaining the carrying operation of the apparatus of FIG. 1, in which 4(A) is an explanatory diagram showing the movement of the carrying members, and 4(B) and 4(C) are explanatory diagrams showing the operation of the preform grasping/releasing mechanism.
Figure 4B:
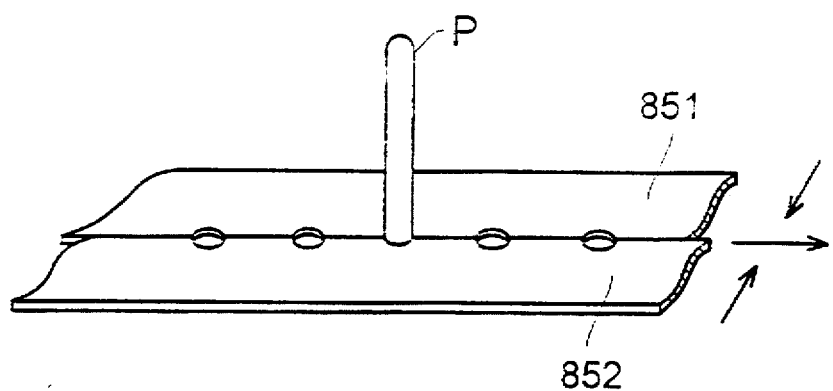

The preform P moving operation at the first carrying section 8 of this embodiment will be explained with reference to FIGS. 4 and 5. Assume that a carrying member 82 on the beam 81 is at the initial position 82A shown in FIG. 4(A) on the upstream side in the carrying direction A. At this time, the pair of left and right grasping plates 851, 852 of the grasping/releasing mechanism 85 are closed so that, as shown in FIG. 4(B), they grasp a preform P (time point T0 in FIG. 5). From this state, the lifting mechanism 84 first lowers the carrying member 82 to a second position 82B (time point T1 in FIG. 5). As a result, the insertion rod 823 of the carrying member 82 is extracted from the opening of the preform P, thus bringing the carrying member 82 out of contact with the preform P.

Figure 4C:
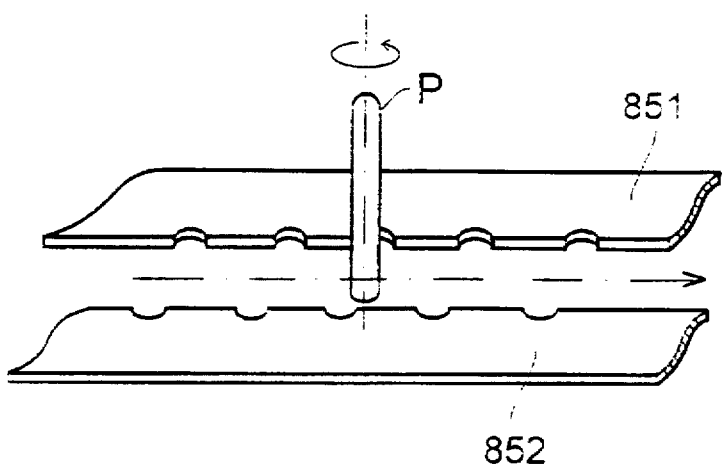

Next, the carrying mechanism 83 retracts the beam 81 in the upstream direction by 2L. As a result, the carrying member 82 reaches a retracted third position 82C (time point T2 in FIG. 5). The lifting mechanism 84 then raises the beam 81 to bring the carrying member 82 to a retracted position 82D. The retracted position 82D at this time is a position of the carrying member 82 upstream of the initial position 82A by two pitches. Since the grasping/releasing mechanism holds a preform P at this position, the rise of the beam 81 causes the insertion rod 823 of the carrying member 82 to be inserted into the opening of preform P, whereby the preform P is supported on the carrying surface 822 of the carrying member (time point T3 in FIG. 5). Then, as shown in FIG. 4(C), the grasping plates 851, 852 of the grasping/releasing mechanism 85 are opened (time point T4 in FIG. 5). As a result, the preform P is supported solely by the carrying member 82. The carrying mechanism 83 then advances the carrying member 82 back to the initial position 82A (time point T5 in FIG. 5). Since the rod 821 of the carrying member 82 rotates constantly at this time, the preform P supported thereby also rotates constantly as it is carried. The grasping plates 851, 852 of the grasping/releasing mechanism 85 are thereafter closed so as establish the grasped state of the preform P (time point T6 in FIG. 5).

Thus, in this embodiment, the carrying members 82 which move integrally with the beam 81 feed the preforms P at a constant feed pitch of once every 2L. During feeding of the preforms P supported on the carrying members 82, they are rotated by a rotation means utilizing the motor 825. However, they are not rotated at the halted positions where they are grasped by the pair of grasping plates 851, 852.

Figure 5:
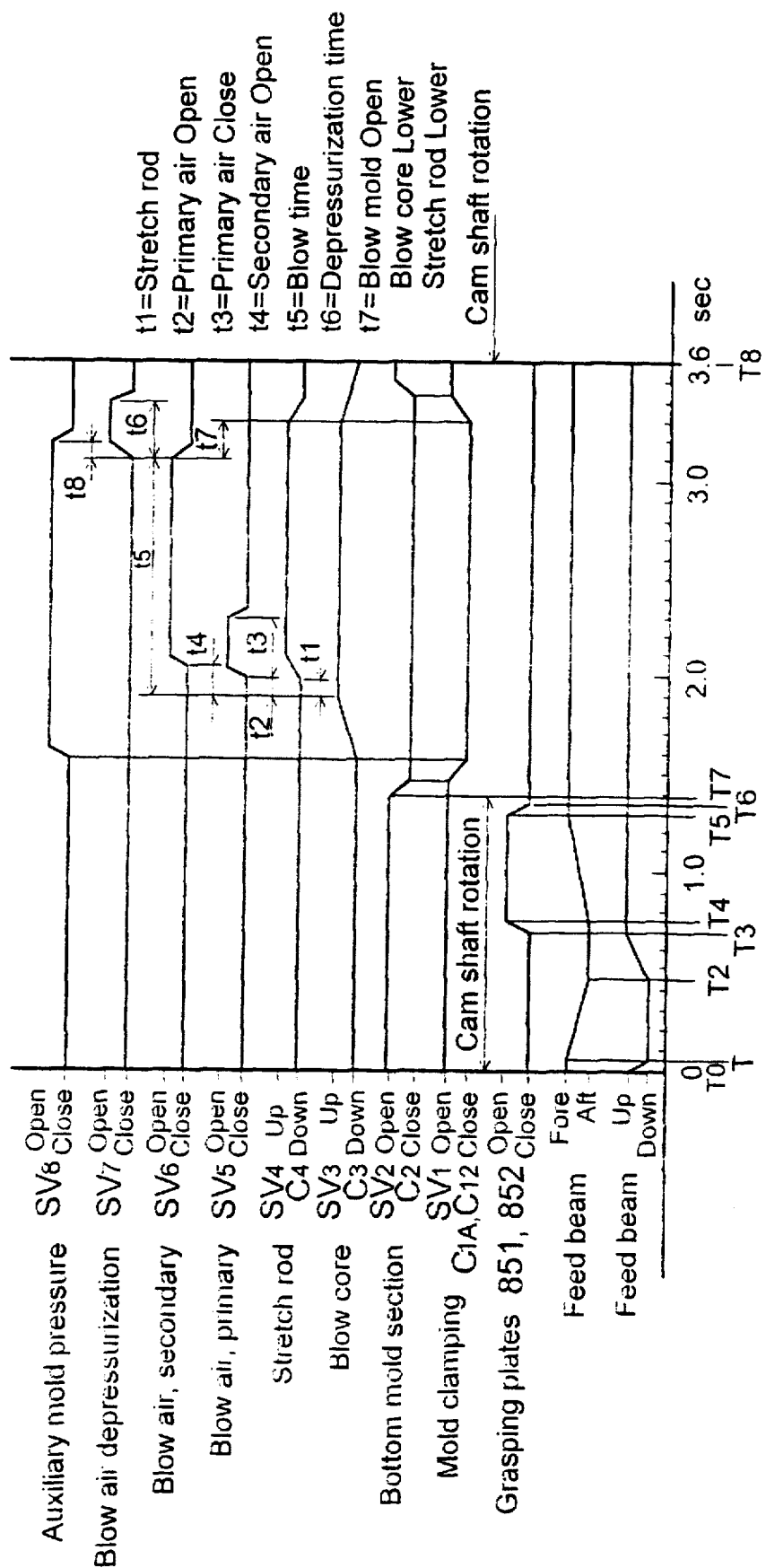
FIG. 5 is a time chart showing the operation of the apparatus of FIG. 1.

As shown in FIG. 5, the fed preforms are molded in the stretch-molding machine 7 after each carrying operation (between time points T7 and T8). Since the stretch-molding machine 7 of this embodiment conducts the same molding operation as machines in general use, no explanation will be given regarding either its structure or operation.

Cycles identical to the foregoing are thereafter repeated for carrying and molding of preforms.

In this embodiment, the second carrying section 9 for receiving the preforms P from the first carrying section 8 of the foregoing structure and forwarding them to the stretch-molding machine 7 has basically the same configuration as the first carrying section 8. As shown in FIG. 1, however, the second carrying section 9 is equipped with a single pair of carrying members 91, 92 whose spacing interval L at retracted positions 91A, 92A differs from their spacing interval L2 at the stretch-molding machine. For making the feed pitch different in this way it suffices to utilize a cam-link mechanism and to set them for establishing different pitches. Alternatively, it is possible to establish the different feed pitches such as by forcibly compressing and releasing multiple carrying members made slidable through the medium of compression springs. The carrying members of the second carrying section 9 have the same configuration as those of the first carrying section 8 except for the points that a single pair of the carrying members are provided, and that they have different feed pitches and are not equipped with rotation mechanisms.

On the other hand, the third carrying section 11 also has basically the same configuration as the first carrying section 8, is equipped with a single pair of carrying members 111, 112, moves them at the same pitch, removes molded containers B1, B2 from the stretch-molding machine 7 two at a time and delivers them to the next processing station (not shown). This carrying section is the same as the first carrying section 8 except for the point that its feed pitch is different and the point that it is not equipped with a molding rotation mechanism.

(Preform heating control)

Next, the preform P heating control system in the downstream heating station 6 of the apparatus of this embodiment and its operation will be explained.

Figure 6:
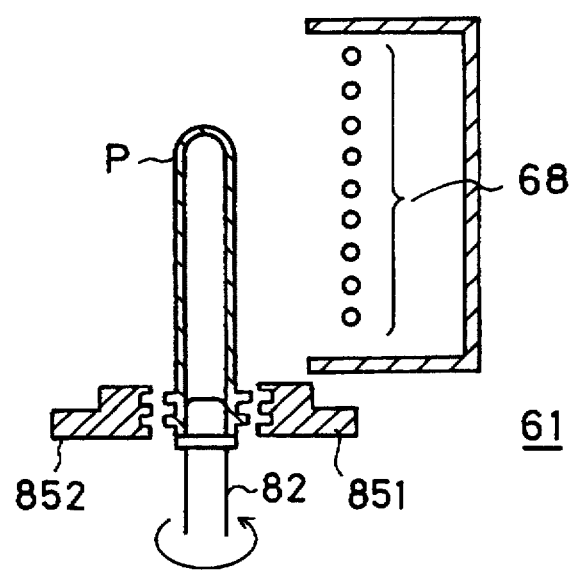
FIG. 6 is a vertical sectional view of the heating system at a downstream heating station of the apparatus of FIG. 1.

FIG. 6 shows the sectional configuration of the downstream heating station 6 at the upstream side carrying line 61. As shown in this figure, multiple near infrared heaters 68 arrayed in a single vertical row at regular intervals extend along one side of the carrying line in the carrying direction.

Figure 7:
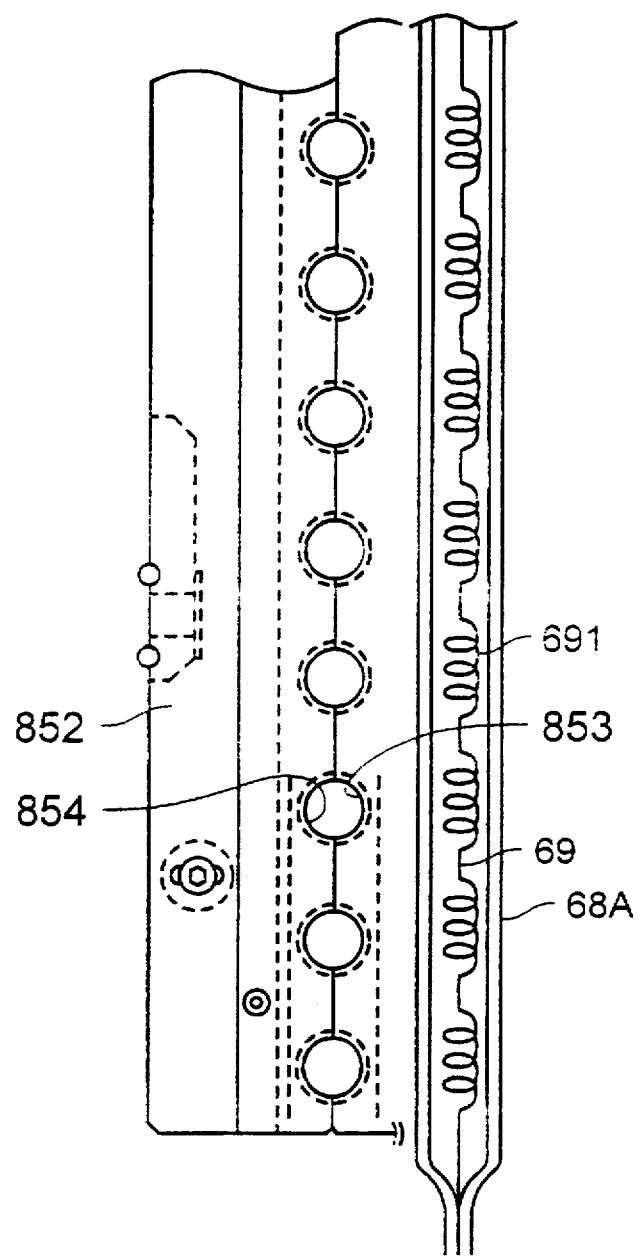
FIG. 7 is a plan view schematically illustrating the heating system at the downstream heating station of the apparatus of FIG. 1.

As shown in FIG. 7, the filament 69 sealed in the sealing tube 68A of each near infrared heater 68 is formed to have coil sections 691, the substantial heat sources, at prescribed intervals in the longitudinal direction. In this embodiment, each of the coil sections 691 constituting the substantial heat sources of the filament 69 is located to the side of one of the semicircular depressions 853, 854 of the grasping plates 851, 852. The preform grasping sections formed by the meeting of the semicircular depressions 853, 854 of the grasping plates 851, 852 are halt positions of the intermittently fed preforms P.

Figure 8:
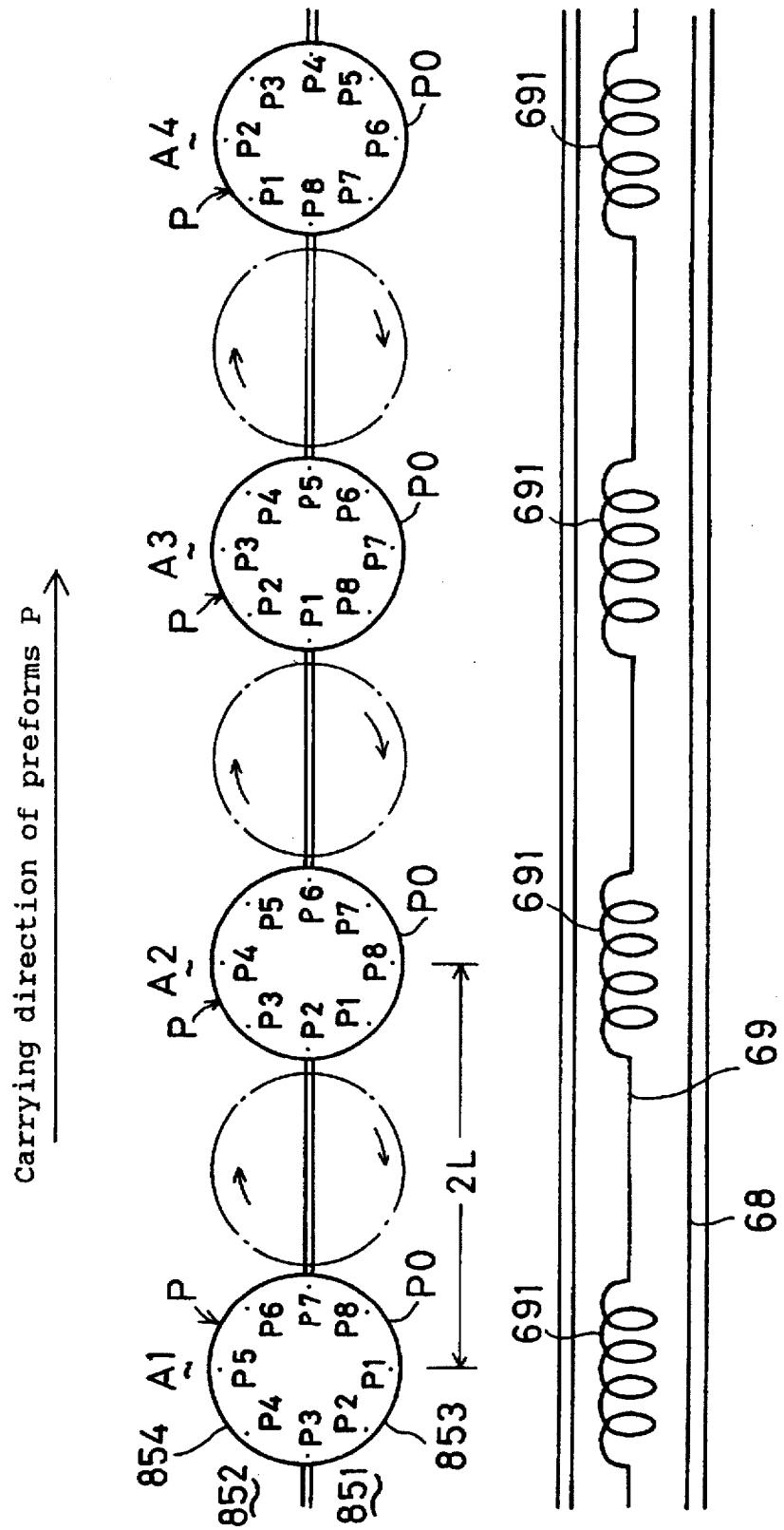
FIG. 8 is plan view schematically illustrating the relationship between preform rotation and heating position at the downstream heating station of the apparatus of FIG. 1.

Therefore, as schematically illustrated in FIG. 8, the preforms P are heated by radiant heat from the coil sections 691 of the filaments 69 while being halted owing to their being grasped by the semicircular depressions 853, 854 of the grasping plates 851, 852. While being fed, on the other hand, they are rotated by the carrying members 82. At the time the preforms P are being rotated during movement between the halt positions A1, A2, A3 . . . , however, they move through regions where the filaments 69 have no coil sections 691, i.e., along sections where the filaments are straight. They therefore receive substantially no radiant heat.

Thus in this embodiment a heating means capable of intermittently heating the preforms P is constituted by use of the near infrared heaters 68 each consisting of a filament 69 formed at prescribed intervals with coil sections 691.

If the same outer side surface portion of a preform P were to face the filaments each time the preform is halted, only this portion would be heated. In this embodiment, therefore, the preforms P are rotated so that a different portion of the outer side surface P0 thereof faces the coil sections 691 at each halt position A1, A2, A3 . . . .

For instance, assuming that the outer side surface P0 of each preform P is divided into equiangular portions P1–P8 as shown in FIG. 8, the portion P1 of the outer side surface P0 of the preform P is brought to face the coil sections 691 of the filaments 69 at the first halt position A1 on the carrying line. As a result the radiant heating of the preform P centers on a region of its outer side surface P0 corresponding to the portion from P8 to P2. Next, while the same preform P is being carried to the halt position A2 on the carrying line, it is rotated several times by the carrying member 82 and the portion P8 of the outer side surface P0 of the preform P is brought to face the coil sections 691 of the filaments 69 at the halt position A2. As a result, the radiant heating of the preform P centers on the region of the outer side surface P0 between P7 and P1. Different portions of the outer side surface P0 of the preform P are thereafter brought to face the coil sections 691 of the filaments 69 at the halt position A3, A4 . . . . During passage through the downstream heating station 6, therefore, the outer side surfaces P0 of the preforms P are subjected to intermittent or discontinuous radiant heating by the near infrared heaters 68, whereby their entire outer peripheries are uniformly heated.

Figure 9:
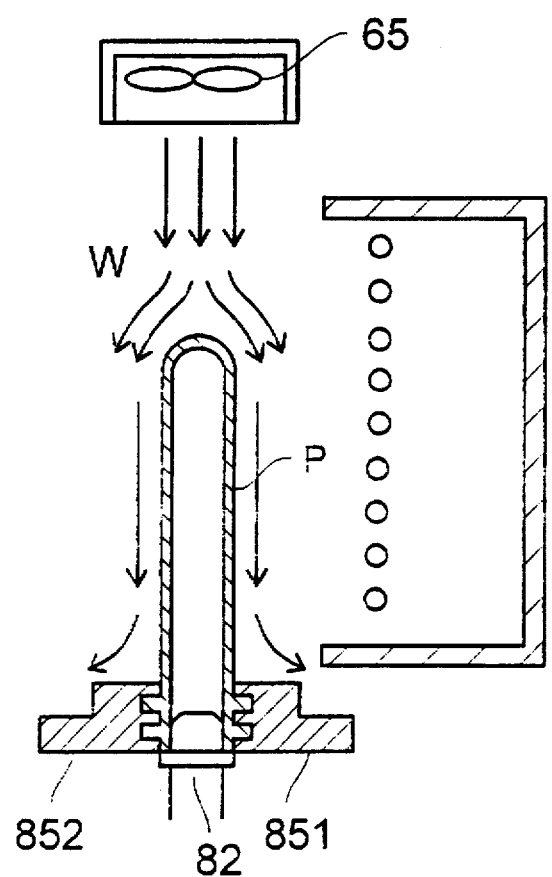
FIG. 9 is an explanatory diagram of a preform cooling system at the downstream heating station of the apparatus of FIG. 1.

On the other hand, the downstream side carrying line 62 in the downstream heating station 6 is fitted with a cooling system for cooling the radiantly heated preforms P. As shown in FIG. 9, the cooling system of this embodiment is equipped with a fan 65 installed directly above the carrying line. The air stream W from the fan 65 is directed onto the preform P from immediately overhead, flows along the exterior thereof and passes to the exterior.

In this embodiment, the cooling action of the fan is set to start at a time point after the temperature of the radiantly heated preform P has passed the peak value.

The heated condition of the preforms P in the downstream heating station 6 of this embodiment will be explained with reference to FIG. 10(C). Curves A1 and A2 in FIG. 10(C) represent the temperature changes at the outer surface and inner surface of a preform P when the preform P is continuously heated by radiant heat and naturally cooled. The temperature difference between the inner and outer surfaces of the preform when the heating temperature reaches its peak in this case is defined as $_A$(A1−A2). In contrast, in this embodiment the temperatures of the inner and outer surfaces of the preform P rise stepwise since the radiant heating is conducted intermittently. Specifically, the inner and outer surface temperatures follow the curves D2, D1. As can be seen from these curves, the peak values of the inner and outer surface temperatures is lower than in the case of continuous heating. Further, the degree to which the peak values are lower is greater for the outer surface temperature. Because of this, the inner-outer surface temperature difference $_A$(D1−D2) is smaller than that in the case of continuous radiant heating.

In order to heat the inner surface to the desired temperature, the outer surface is heated to a considerably higher temperature. In this embodiment, however, since the difference between the inner and outer surface temperatures can be narrowed, the outer surface temperature at the time the inner surface has been raised to the required temperature can be held lower than in the prior art. The intermittent radiant heating of this embodiment therefore makes it possible to avoid the harm caused by degradation owing to excessive heating of the outer surface.

Moreover, since the inner-outer surface temperature difference $_A$(D1−D2) is smaller than that in the case of continuous radiant heating, a temperature state suitable for molding in which the inner surface temperature is higher than the outer surface temperature can be achieved with a short cooling period. As the efficiency of the molding line increases with shorter cooling period, the productivity therefore rises.

In this embodiment, the preform P is cooled by air blown thereon from the fan 65 at a time point after the inner and outer surface temperatures have passed their peak values (indicated by an arrow in the figure). Since this blowing of air rapidly reduces the outer surface temperature, a temperature state suitable for molding can be realized in a short time. Particularly noteworthy is that in this embodiment the air is blown onto the preform in the axial direction of the preform from directly overhead, which enables the cooling of the preform to be conducted uniformly about its whole periphery and with good efficiency.

Figure 10A:
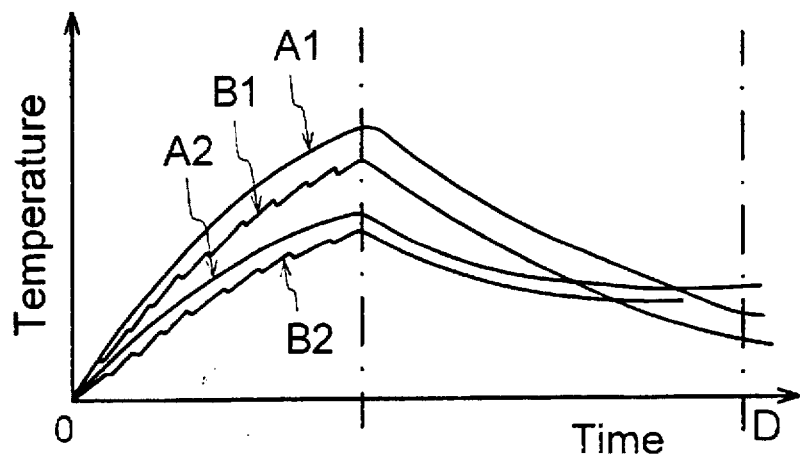
FIGS. 10(A)–10(C) are a set of graphs showing change in inner and outer surface temperature during preform heating, in which 10(A) is a graph for comparing temperature change in the case of conducting continuous radiant heating and temperature change in the case of conducting intermittent radiant heating, 10(B) is a graph for comparing temperature change following continuous radiant heating between the case of natural cooling and the case of cooling by air blowing, and 10(C) is a graph for comparing temperature change between the case of continuous radiant heating and the case of intermittent radiant heating together with cooling by air blowing.
Figure 10B:
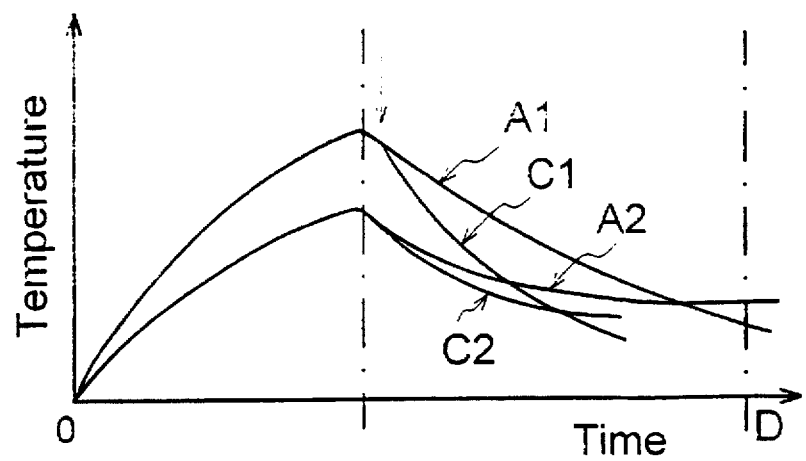
Figure 10C:
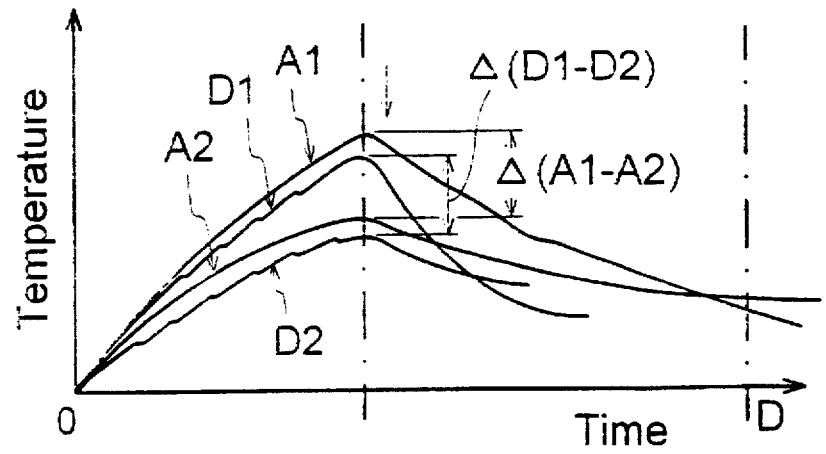

FIG. 10(A) shows the inner and outer surface temperature change curves B2, B1 in the case of intermittent radiant heating without cooling with a cooling fan, along with the temperature change curves A2, A1 in the case of continuous radiant heating. FIG. 10(B) shows the inner and outer surface temperature change curves C2, C1 in the case of continuous radiant heating followed by cooling with a cooling fan, along with the temperature change curves A2, A1 in the case of continuous radiant heating. As can be seen from these graphs, even when only intermittent radiant heating is adopted, the merit of being able to prevent excessive heating of the outer surface of the preform is nevertheless obtained. Further, when only cooling with a fan is adopted, the merit of being able to establish a temperature state suitable for molding in a short time is nevertheless obtained.

In the foregoing embodiment, it is of course possible also to conduct intermittent radiant heating in the upstream heating station 5.

(Another example of the heating control system)

Figure 11A:
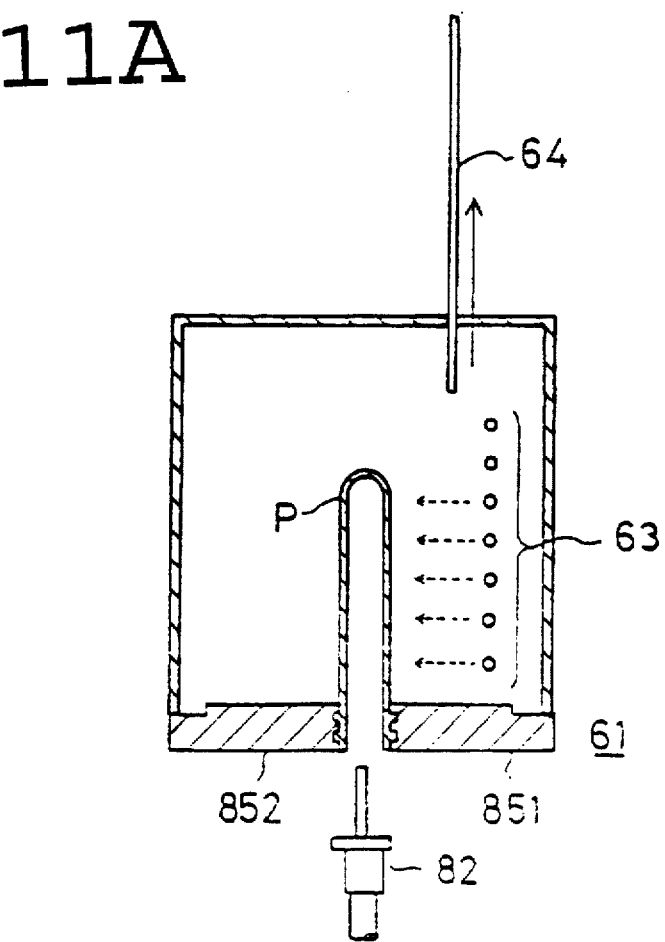
FIGS. 11A and 11B are a set of diagrams showing another example of an intermittent heating system at the downstream heating station of the apparatus of FIG. 1, in which (A) is a schematic sectional view showing the state of radiant heating and (B) is a schematic sectional view showing the state of radiant heat shielding.
Figure 11B:
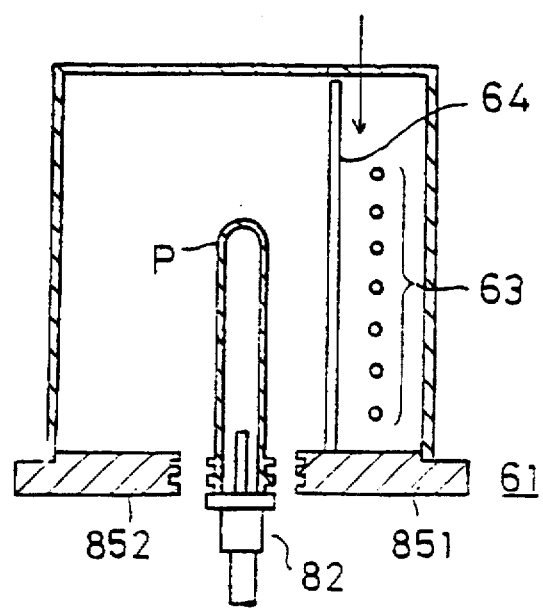

FIG. 11 shows another example of a heating control system installed at the upstream side carrying line 61 of the downstream heating station 6. In this example, multiple near infrared heaters 63 arrayed in single vertical row at regular intervals extend along one side of the carrying line in the carrying direction. A vertical shutter blade 64 is disposed between the near infrared heaters 63 and the preforms P carried on the carrying line. The shutter blade 64 is movable vertically by a drive mechanism (not shown). In this example, the shutter blade 64 is raised, as shown in (A), and radiant heating is conducted when the preforms P are grasped by the grasping/releasing mechanism 85 and are not being rotated. As shown in FIG. 11(B), however, the shutter blade 64 is lowered and the radiant heat is blocked when the preforms P are being carried by the carrying member 82 while being rotated. In this way, the shutter blade 64 is moved up and down in association with the preform P carrying operation for intermittently or discontinuously heating the preforms P with radiant heat from the near infrared heaters 163.

The same effect as in the case of the intermittent heating shown in FIG. 7 is also obtained when the heating control system of the foregoing configuration is adopted.

(Structure of the stretch-molding machine)

Figure 12:
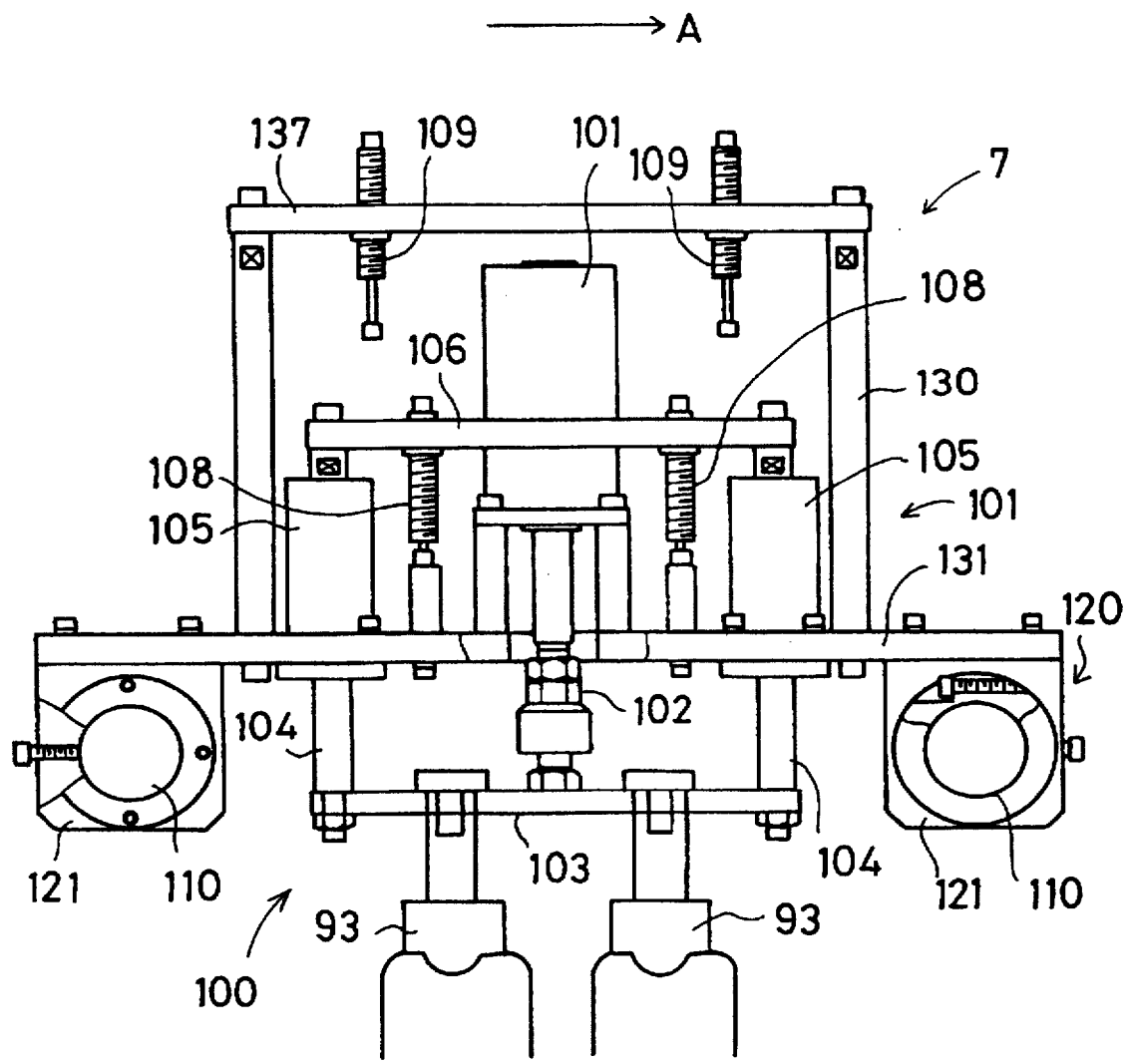
FIG. 12 is a side view of an essential portion of a stretch-molding machine of the apparatus of FIG. 1.
Figure 13:
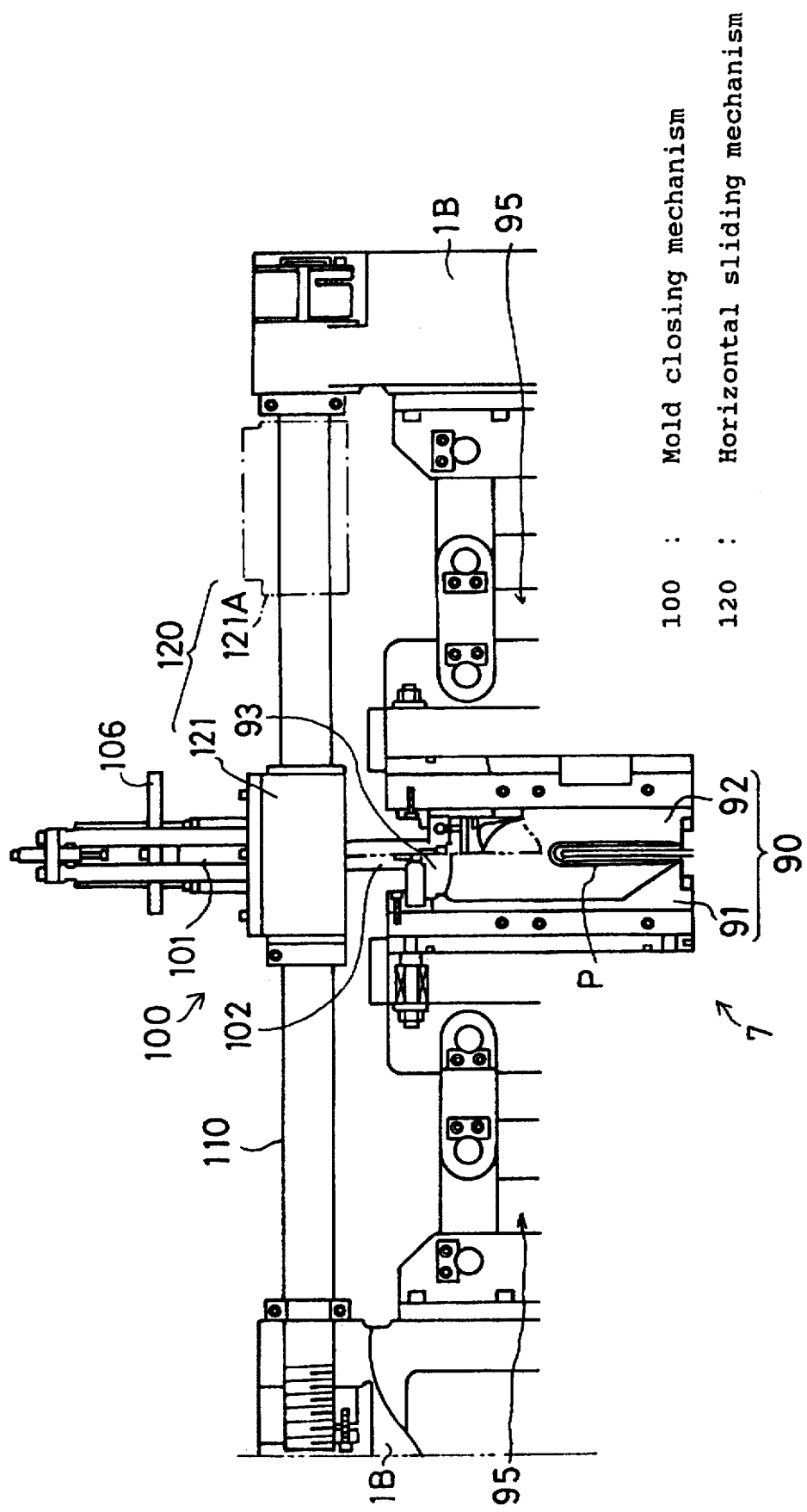
FIG. 13 is a front view of an essential portion of the stretch-molding machine of the apparatus of FIG. 1.

An example of the configuration of the stretch-molding machine 7 will next be explained with reference to FIGS. 12 and 13. FIG. 12 is a side view showing a portion of the stretch-molding machine centering on an upper part of the blow molds, and FIG. 13 is a front view thereof.

As shown in these figures, in the stretch-molding machine 7 of this embodiment, blowing molds 90 for stretch-molding preforms P into containers B1, 2 of the desired shape each includes split mold sections 91, 92 defining a prescribed container side surface shape and a bottom mold section 93 defining the shape of the container bottom. Since this blowing mold 9 has the same structure as in the prior art it will not be described in detail, other than to mention that the split mold sections 91, 92 are opened laterally by a mold opening mechanism 95 at the time of unmolding. The bottom mold section 93 is provided with a pneumatic or hydraulic cylinder 101 via a ram 102. The cylinder and the ram 102 constitute a mold closing mechanism 100 for pressing down the bottom mold section 93 at the time of molding. The mold closing mechanism 100 is arranged so that at the time of unmolding the cylinder 101 operates to raise the ram 102 and pull the bottom mold section 93 up to a prescribed height.

In this embodiment, two guide shafts 110 extend perpendicularly to the carrying direction of the preforms P and the containers B1, B2 between a pair of frames 1B at an upper portion of the stretch-molding machine 7. Sliders 121 are mounted on the guide shafts 110 to constitute a horizontal sliding mechanism 120 for withdrawing the bottom mold section 93 from its prescribed position by horizontal movement of the sliders 121. A frame 130 is supported on the sliders 121 of the horizontal sliding mechanism 120. The frame 130 is provided with a horizontally oriented fixed plate 131 and the cylinder 101 is fixed at the center of the upper surface of the fixed plate 131 with the ram 102 directed downward. A bottom mold section support plate 103 is attached to the lower end portion of the ram 102 and the pair of bottom mold sections 93 are fixed on the bottom mold section support plate 103 facing downward. Guides 105 are provided on top of the fixed plate 131 in association with rods 104 extending upward from the bottom mold section support plate 103. Stops 109 are provided between the fixed plate 131 and a movable plate 106 fixed horizontally on the upper end portions of the rods 104 for defining the lower limit position of the movable plate 106. In addition, stops 109 are provided between the movable plate 106 and a top plate 137 of the frame 130 for defining the upper limit position of the movable plate 106.

When the setup of the so-configured stretch-molding machine 7 is to be changed, the cylinder 101 of the mold closing mechanism 100 is first operated for withdrawing the bottom mold sections 93 from their set positions during molding. Next, in the horizontal sliding mechanism 120, the sliders 121 are moved horizontally on the guide shafts 110 to the position indicated by the imaginary line 121 in FIG. 13, thereby moving the entire frame 130 horizontally in the direction perpendicular to the carrying direction of the preforms P. As a result, the bottom mold sections 93 are withdrawn together with the frame 130 and the mold closing mechanism 100 to positions where they can be easily changed. Since the space above the split mold sections 91, 92 is therefore completely opened, the changing of the split mold sections 91, 92 is simple. The time required for changing the setup is consequently shortened.

Second embodiment

Figure 14:
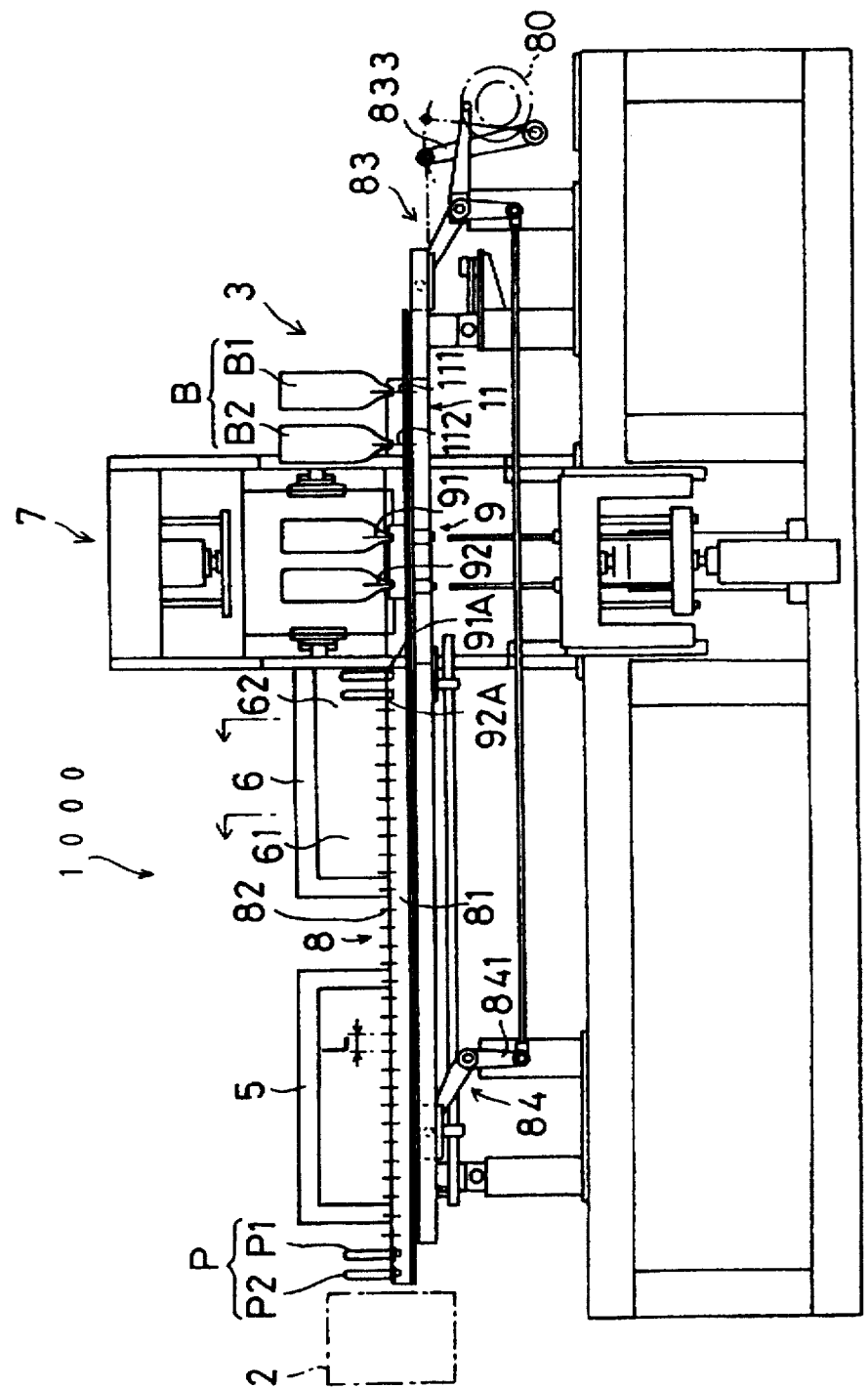
FIG. 14 is a schematic side view showing the structure of a blow molding apparatus which is a second embodiment of the invention.
Figure 15:
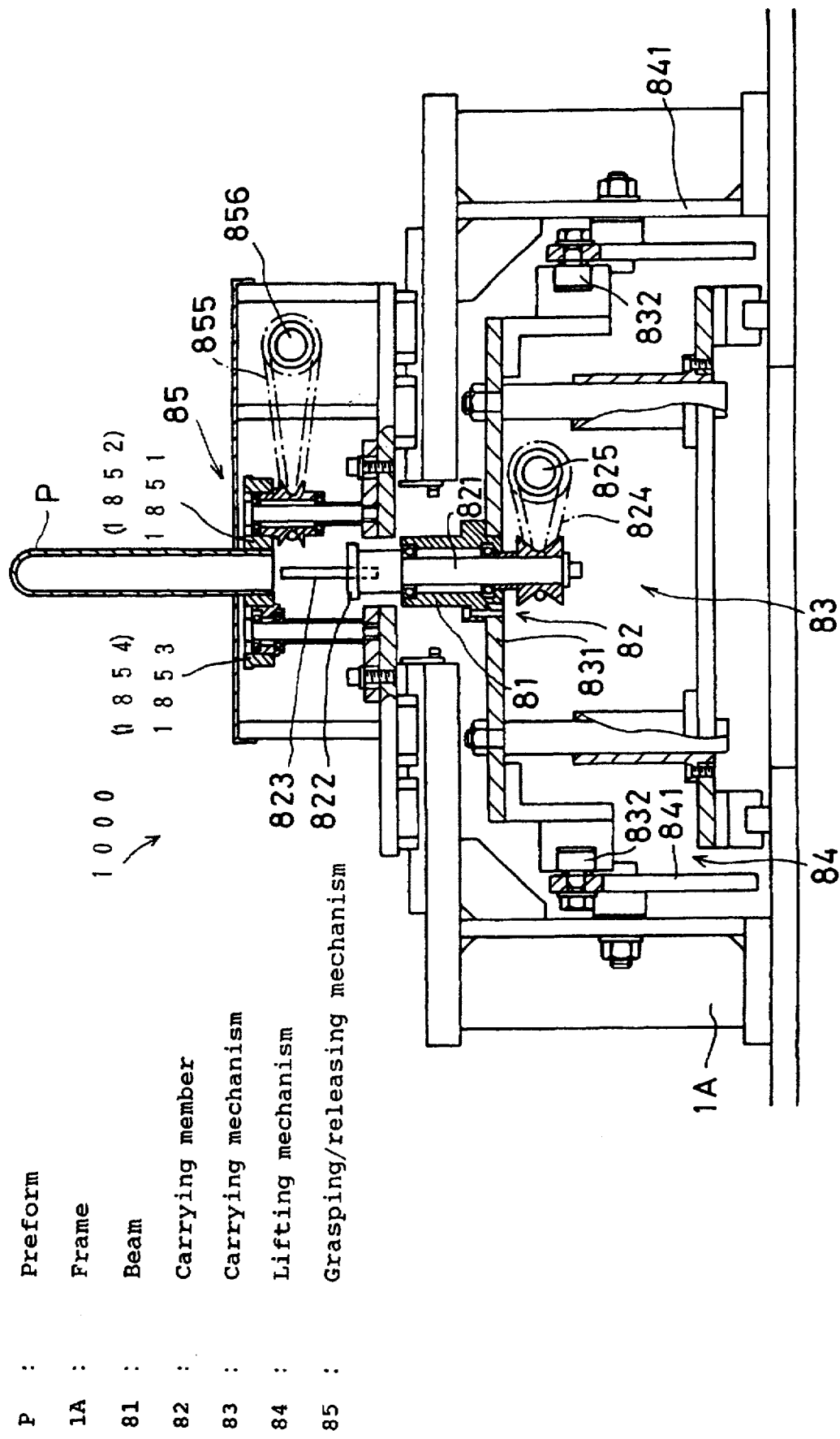
FIG. 15 is a schematic cross-sectional view of the apparatus of FIG. 14.
Figure 16A:
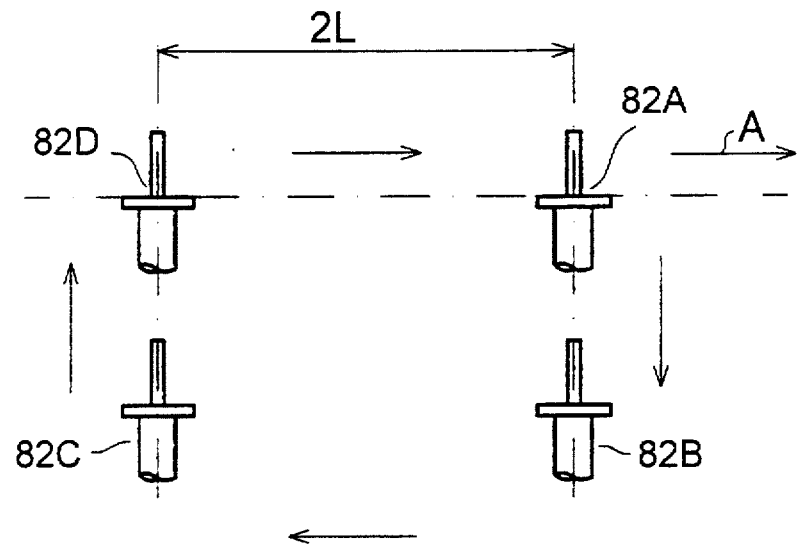
FIGS. 16(A), 16(B), and 16(C) are partial plan views showing a pair of grasping plates of a grasping/releasing mechanism of the apparatus of FIG. 14.

FIGS. 14 to 16 show the overall structure of another embodiment of the blow molding apparatus of the present invention. The basic structure of the blow molding apparatus of this embodiment is the same as that of the first embodiment. Corresponding portions will therefore be explained using like reference numerals.

FIGS. 14 and 15 show the overall structure of the blow molding apparatus of this embodiment. The blow molding apparatus 1000 of this embodiment is also for blow molding of PET bottles, namely for stretch-molding preforms P of test tube shape into mold containers B for soft drinks or the like.

As shown in FIG. 14, the apparatus 1000 of this embodiment receives two preforms P1 and P2 at a time from a preform loading station 2 at the left end of the figure and, after molding them, delivers the resulting containers B1, B2 from a container takeoff station 3 to the next processing station (not shown). A linear carrying line is formed between the loading station 2 and the takeoff station 3. An upstream heating station 5, a downstream heating station 6 and a stretch-molding machine 7 are disposed in order along carrying direction of the carrying line. The preforms P carried along the carrying line are heated to a prescribed temperature in the upstream station 5 and then have their surfaces cooled after passing therethrough. They are then reheated to a temperature appropriate for stretch-molding and the surfaces thereof are again cooled in the downstream heating station 6. Next, they are stretch-molded in the stretch-molding machine 7 to form containers B.

The carrying mechanism for carrying the preforms P along the carrying line is constituted of a first carrying section 8 for carrying the preforms P received at the loading station 2 to the entrance of the stretch-molding machine 7, a second carrying section 9 for receiving the preforms P from the first carrying section 8 and molding them in the stretch-molding machine 7, and a third carrying section 11 for carrying formed containers B to the takeoff station 3.

The structure of the first carrying section 8 will explained with reference to FIGS. 14 and 15. The first carrying section 8 is basically constituted of a beam 81 disposed along the carrying line, multiple carrying members 82 mounted on the upper surface of the beam 81, a carrying mechanism 83 for moving the beam 81 forward and backward in the carrying direction, a lifting mechanism 84 for raising and lowering the beam 81, and multiple grasping/releasing mechanism 85 disposed along the carrying line.

The carrying members 82 are mounted on the upper surface of the beam 81 as spaced at regular intervals L. Each carrying member 82 has a rod 821 supported to be rotatable relative to the beam 81, a carrying surface 822 formed at the upper end of the rod 821, and an insertion rod 823 extending vertically from the center of the carrying surface 822. The carrying mechanism 83 of the beam has a support section 831 for supporting the beam 81 and the support section 831 is supported by the lifting mechanism 84 through rollers 832 so as to be movable forward and backward in the carrying direction by the beam lifting mechanism 84. In addition, one end of the beam support section 831 is connected through a linkage (not shown) with a linkage 833 for oscillating forward and backward in the carrying direction. The beam support section 831 can be moved forward and backward relative to the carrying direction at a constant pitch by the oscillation of the linkage 833. In this embodiment, it can be moved at a constant feed pitch of 2L.

The lifting mechanism 84 is constituted of the aforesaid beam support section 831 and a vertical guide 841 which supports the beam support section 831 through the rollers 832 so as to be vertically movable with respect to an apparatus frame 1A. The beam support section 831 is configured to be raised and lowered by a constant distance by the linkage 841. This embodiment is configured to conduct the beam movement and lifting operations by power supplied through a linkage from a common power source. Since this linkage can have any of various configurations and the related technology is well known among experts in the field, the particulars thereof are omitted from this specification.

In this embodiment, the lower end of the rod 821 of the carrying member 82 is connected through a pulley and a belt 824 with a motor 825 attached to the support section 831. The rod 821 is rotated about its axis by this motor.

As shown in FIG. 15, at a position corresponding to that of each carrying member 82 there is disposed a grasping/releasing mechanism 85 equipped with four rollers 1851, 1852, 1853 and 1854 whose centers lie on a circle whose center coincides with the axis of the carrying member 82. Each of the rollers 851, 852 on one side is attached to be movable in a direction perpendicular to the carrying direction. Further, the roller 1851 is a drive roller connected through a belt-pulley mechanism 855 with a motor 856. The motor 856 is supported to move integrally with the rollers 1851, 1852. The other rollers 1853, 1854 are similarly attached to be movable in a direction perpendicular to the carrying direction. As illustrated, in this embodiment the rollers on the opposite sides are set so as to establish between them a grasped state of a preform P when they approach each other. When the roller 1851 is rotated in this state, therefore, the preform P held between the rollers can be rotated about its axis. Needless to say, the rotational speed of the rollers approximately coincides with the speed at which the preform P rotates about its axis owing to the rotation of the carrying member 82.

In this embodiment, the operation of opening and closing the left and right rollers is also conducted through a linkage or the like by the same power source 80 as that for the beam 81.

Figure 16B:
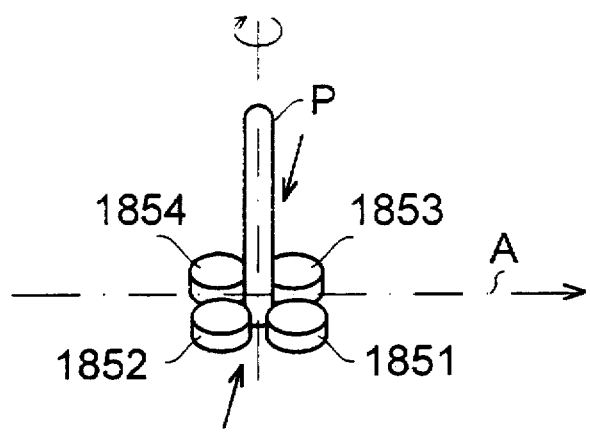

The preform P moving operation at the first carrying section 8 of this embodiment will be explained with reference to FIG. 16. Assume that a carrying member 82 on the beam 81 is at the initial position 82A on the upstream side in the carrying direction A. At this time, the group of rollers of the grasping/releasing mechanism 85 are closed so that, as shown in FIG. 16(B), they grasp a preform P. From this state, the lifting mechanism 84 first lowers the carrying member 82 to a second position 82B. The preform P is grasped by the grasping/releasing mechanism 85 and held in a rotatable state. As a result of this lowering, the insertion rod 823 of the carrying member 82 is extracted from the opening of the preform P.

Figure 16C:
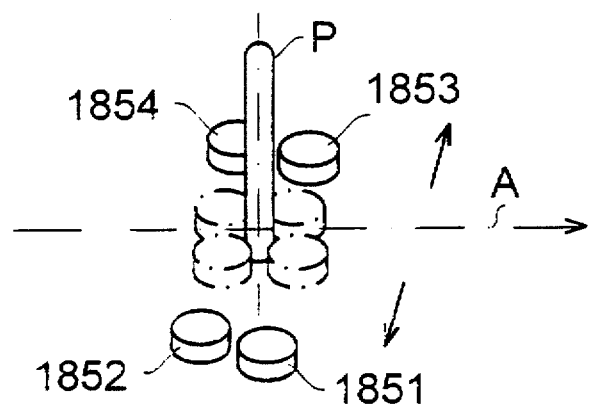

Next, the carrying mechanism 83 retracts the beam 81 in the upstream direction by 2L. As a result, the carrying member 82 reaches a retracted third position 82C. The lifting mechanism 84 then raises the beam 81 to bring the carrying member 82 to a retracted position 82D. The retracted position 82D at this time is a position of the carrying member 82 upstream of the initial position 82A by two pitches. Since the grasping/releasing mechanism holds a preform P at this position, the rise of the beam 81 causes the insertion rod 823 of the carrying member 82 to be inserted into the opening of preform P, whereby the preform P is supported on the carrying surface 822 of the carrying member. Then, as shown in FIG. 16(C), the group of rollers constituted as three or more rollers per block (four in this embodiment) of the grasping/releasing mechanism 85 are opened to the left and right. As a result, the preform P is supported solely by the carrying member 82. The carrying mechanism 83 then advances the carrying member 82 back to the initial position 82A. Since the rod 821 of the carrying member 82 rotates constantly at this time, the preform P supported thereby also rotates constantly as it is carried. The roller group of the grasping/releasing mechanism 85 is thereafter closed so as establish the grasped state of the preform P.

Thus in this embodiment, the carrying members 82 which move integrally with the beam 81 feed the preforms P once every constant feed pitch 2L.

The fed preforms are molded in the stretch-molding machine 7 after each carrying operation. Since the stretch-molding machine 7 of this embodiment conducts the same molding operation as machines in general use, no explanation will be given regarding either its structure or operation.

Cycles identical to the foregoing are thereafter repeated for feeding and molding of preforms.

In this embodiment, the second carrying section 9 for receiving the preforms P from the first carrying section 8 of the foregoing structure and forwarding them to the stretch-molding machine 7 is configured similarly to the first carrying section 8. As shown in FIG. 14, however, the second carrying section 9 is equipped with a single pair of carrying members 91, 92 whose spacing interval L at retracted positions 91A, 92A differs from their spacing interval L2 at the stretch-molding machine. For making the feed pitch different in this way it suffices to utilize a cam-link mechanism and to set them for establishing different pitches. Alternatively, it is possible to establish the different feed pitches such as by forcibly compressing and releasing multiple carrying members made slidable through the medium of compression springs. The carrying members of the second carrying section 9 have the same configuration as those of the first carrying section 8 except for the points that a single pair of the carrying members are provided, and that they have different feed pitches and are not equipped with rotation mechanisms.

On the other hand, the third carrying section 11 is also basically the same as the first carrying section 8, is equipped with a single pair of carrying members 111, 112, moves them at the same pitch, removes molded containers B1, B2 from the stretch-molding machine 7 two at a time and delivers them to the next processing station (not shown). This carrying section is the same as the first carrying section 8 except for the point that its feed pitch is different and the point that it is not equipped with a molding rotation mechanism.

In the carrying mechanism of the blow molding apparatus 100 configured according to this embodiment, the feeding of the preforms is achieved by repeatedly moving the multiplicity of carrying members 82 supported by the beam 81 forward/backward and up/down. The carrying mechanism is therefore simpler and less expensive to manufacture than a carrying mechanism which, as in the prior art, is configured to move the carrying members themselves along the carrying line.

The preforms are rotated by the carrying members during carrying by the carrying members, since the carrying members themselves rotate, and are rotated by the grasping/releasing mechanism consisting of the roller group while the carrying members are being retracted. As a result, the preforms are in a continuously rotated state while being carried through the heating stations 5, 6. The preforms can therefore be uniformly heated.

This embodiment uses cam-link mechanisms to power the beam lifting mechanism, the beam movement mechanism and the grasping/releasing mechanism from the same power source. The apparatus is therefore also advantageous in the point that it can be compactly configured. In addition, since the second and third carrying sections used to feed the preforms and the moldings at different pitches are also powered by the same power source, a further reduction in apparatus size is possible.

In the carrying mechanism of this embodiment, the carrying members 82 merely move forward/backward and up/down at a fixed location. It is therefore easy to implement a configuration in which some of the carrying members are not rotated and the preforms carried by these carrying members are not rotated. Therefore, if, for instance, only one or some number of the carrying members 82 of the downstream heating station 6 located immediately ahead of the stretch-molding machine 7 are not rotated, it becomes possible to locally heat or cool only a desired portion of the preforms P carried through this region.

The imparting of a temperature change to a preform immediately before stretch-molding in this manner makes it possible to control the amount of stretching at different portions during stretch-molding and thus to adjust the thickness of the molding. This advantageously makes it possible to avoid problems such as that of excessive thinning of portions where the amount of stretching is large.

As the mechanism for locally heating and/or cooling the preforms P, there can be adopted a mechanism for blowing air adjusted to a prescribed temperature range onto a desired portion. Instead, it is also possible to adopt a mechanism for bringing a heat conductive piece adjusted to a prescribed temperature into contact with a desired portion of the preforms.

In order to appropriately carry out the stretch-molding, it suffices to establish a uniform temperature state in the preforms by blowing air adjusted to a prescribed temperature on to them in the downstream heating station 6 immediately prior to stretch-molding.

Industrial Applicability

As explained in the foregoing, in the blow molding apparatus according to this invention, the carrying members of the preform carrying mechanism only move by the amount of the feed pitch. Moreover, the grasping/releasing mechanism need only conduct its preform grasping/releasing operation at a fixed position. The carrying mechanism is therefore much simpler, and also less expensive to constitute, than the prior-art arrangement in which the carrying members are circulated along the carrying line.

Moreover, the blow molding apparatus according to this invention intermittently or discontinuously heats the preforms by radiant heat using a configuration in which, for example, heat sources are disposed at positions corresponding to the halt positions of the individual preforms. Unlike in the prior-art heating systems, therefore, the invention enables the inside surface temperature of the preforms to be adequately increased without excessively increasing the outside surface temperature thereof. Further, since the difference between the inside and outside surface temperatures can be reduced, it is possible to establish a temperature state in which the inside surface temperature is higher, namely, a temperature state suitable for molding, in a short time after heating.

In addition, the invention provides a cooling system for cooling the preforms by blowing air thereon after they have passed peak temperature owing to the heating. This system enables the outer surface temperature of the preforms to be rapidly lowered, making it possible to establish a temperature state suitable for molding in much less time than the prior art.

I claim:

1. A blow molding apparatus comprising
   preform heating means for radiant heating of cylindrical preforms having an opening at a tip end and a closed bottom at another end, stretch-molding means for biaxial stretch-molding of heated preforms into hollow moldings of a prescribed shape, and preform carrying means for intermittently carrying preforms through the heating means to the stretch-molding means at a prescribe feed pitch,
   characterized in that the carrying means includes a linear member extending in a preform carrying direction, multiple preform carrying members supported by the linear member as disposed at regular intervals in the preform carrying direction and capable of being inserted into the openings of the preforms, a carrying mechanism adapted to move the linear member to a retracted position one feed pitch backward by lowering it from its initial position to a lowered position where the carrying members are free of the preforms, moving it from the lowered position backward in a direction opposite to the carrying direction and then raising it, and then to move it forward from the retracted position to the initial position, and a grasping/releasing mechanism adapted to grasp the preforms while the carrying members supported by the linear member are moving from the initial position to the retracted position and to release and give the preforms over to the carrying member upon its arrival at the retracted position.

2. A blow molding apparatus according to claim 1, characterized in that the grasping/releasing mechanism comprises a pair of left and right grasping plates disposed in the carrying direction and preform grasping sections which are formed at intervals in the carrying direction equal to the intervals of the carrying members when the grasping plates are closed onto each other and which grasp preforms upon closing of the grasping plates and release the preforms upon opening of the grasping plates.

3. A blow molding apparatus according to claim 2, characterized in that the heating means comprises radiant heat sources disposed along a preform carrying line of the carrying means, a radiant heat source being disposed at a position corresponding to every preform halt position.

4. A blow molding apparatus according to claim 3, characterized in that the radiant heat sources are constituted as a heating tube enclosing a filament as a heating element and the filament has coiled sections at the preform halt positions and extends straight at positions therebetween.

5. A blow molding apparatus according to claim 4, characterized in that it further comprises preform rotation means for rotating preforms carried by the preform carrying means about their axes, the preform rotation means rotating the preforms to vary the preform outer peripheral surface portion facing the heat source at least between adjacent halt positions.

6. A blow molding apparatus according to claim 5, characterized in that it further comprises air-cooling means for cooling the preforms, after radiant heating, by blowing air thereon, the air-cooling means cooling each preform at a time point after its temperature has passed peak value.

7. A blow molding apparatus according to claim 6, characterized in that the air-cooling means blows air in the axial direction of the preforms.

8. A blow molding apparatus according to claim 7, characterized in that the grasping/releasing mechanism comprises a multiplicity of roller groups disposed at intervals in the carrying direction equal to the intervals of the carrying members and a roller movement mechanism for moving the rollers of the individual groups toward and away from each other for grasping and releasing the preforms.

9. A blow molding apparatus comprising:
   preform heating means for radiant heating of cylindrical preforms having an opening at a tip end and a closed bottom at another end,
   stretch-molding means for biaxial stretch-molding of heated preforms into hollow moldings of a prescribed shape,
   preform carrying means for intermittently carrying preforms through the preform heating means to the stretch-molding means at a prescribed feed pitch,
   the preform heating means comprises radiant heat sources disposed along a preform carrying line of the preform carrying means, a radiant heat source being disposed at a position corresponding to every preform halt position, the radiant heat sources are constituted as a heating tube enclosing a filament as a heating element and the filament has coiled sections at the preform halt positions and extends straight at positions therebetween.

10. A blow molding apparatus according to claim 9, characterized in that it further comprises preform rotation means for rotating preforms carried by the preform carrying means about their axes, the preform rotation means rotating the preforms to vary the preform outer peripheral surface portion facing the heat source at least between adjacent halt position.

* * * * *